United States Patent
Brown et al.

(10) Patent No.: US 7,620,266 B2
(45) Date of Patent: Nov. 17, 2009

(54) ROBUST AND EFFICIENT FOREGROUND ANALYSIS FOR REAL-TIME VIDEO SURVEILLANCE

(75) Inventors: Lisa Marie Brown, Pleasantville, NY (US); Arun Hampapur, Norkwalk, CT (US); Zuoxuan Lu, Yorktown Heights, NY (US); Andrew William Senior, New York, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/039,442

(22) Filed: Jan. 20, 2005

(65) Prior Publication Data

US 2009/0067716 A1   Mar. 12, 2009

(51) Int. Cl.
*G06K 9/64* (2006.01)
(52) U.S. Cl. ............... 382/278; 382/190; 382/274; 382/275; 358/520; 358/464; 345/640; 348/586
(58) Field of Classification Search ......... 382/274, 382/275, 278, 282; 348/135, 143, 586
See application file for complete search history.

(56) References Cited

U.S. PATENT DOCUMENTS

| | | | | |
|---|---|---|---|---|
| 5,912,980 | A * | 6/1999 | Hunke | 382/103 |
| 6,188,777 | B1 * | 2/2001 | Darrell et al. | 382/103 |
| 6,661,918 | B1 * | 12/2003 | Gordon et al. | 382/173 |
| 6,801,662 | B1 * | 10/2004 | Owechko et al. | 382/224 |
| 6,999,620 | B1 * | 2/2006 | Harville | 382/173 |
| 7,071,914 | B1 * | 7/2006 | Marks | 345/156 |

OTHER PUBLICATIONS

C. Stauffer et al., "Adaptive Background Mixture Models for Real-Time Tracking", CVP99, Jun. 1999; 7 pages.
A. Monnet et al., "Background Modeling and Subtraction of Dynamic Scenes"; Proc. of Int'l Conf. on Computer Vision, 2003, pp. 1305-1312.
A Mittal et al., "Motion-based Background Subtraction using Adaptive Kernel Density Estimation"; Proc. on Comp. VIsion and Pattern Recognition, 2004; 8 pages.

(Continued)

*Primary Examiner*—Yosef Kassa
(74) *Attorney, Agent, or Firm*—Keusey, Tutunjian & Bitetto, P.C.; Anne V. Dougherty, Esq.

(57) ABSTRACT

Systems and methods for foreground analysis in real-time video include background subtraction and foreground detection, shadow removal, quick lighting change adaptation, static foreground region detection, foreground fragment reduction, and frame level change detection. Processes include background image extraction and foreground detection, integrating texture information of the background image and a current frame to remove false positive foreground areas resulting from lighting changes, integrating pixel intensity information by determining a cross-correlation of intensities between a current frame and the background image for each pixel in a foreground mask to remove image shadows. Static foreground region detection and fragment reduction are also included.

24 Claims, 3 Drawing Sheets

OTHER PUBLICATIONS

L. Li et al., "Statistical Modeling of Complex Backgrounds for Foreground Object Detection"; IEEE Trans on Image Proc, vol. 13, No. 11, 2004; pp. 1-29.

R. Cucchiara et. al., "Detecting Moving Objects, Ghosts an shadows in Video Streams"; IEEE Trans on Pattern Analysis and Machine Intelligence, vol. 25, No. 10; Oct. 2003; pp. 1-15.

H. Eng et al., "Novel Region-Based Modeling for Human Detection within Highly Dynamic Aquatic Environment"; Proc. on Computer VIsion and Pattern Recognition, 2004; 8 pages.

O. Javed et al., "A Hierarchical Approach to Robust Background Subtraction using Color and Gradient Information"; IEEE Workshop on Motion and Video Computing, 2002; pp. 1-6.

K. Toyama et al., "Wallflower: Principles and Practice of Background Maintenance"; IEEE, 1999; 7 pages.

A. Hampapur et al., "THe IBM Smart Surveillance System"; IEEE 2004; 2 pages.

* cited by examiner

ROBUST AND EFFICIENT FOREGROUND ANALYSIS FOR REAL-TIME VIDEO SURVEILLANCE

BACKGROUND

1. Technical Field

The present invention relates to video processing and more particularly to systems and methods for robust and efficient foreground analysis of video data.

2. Description of the Related Art

Robust detection of moving objects in video streams is a significant issue for video surveillance. Background subtraction (BGS) is a conventional and effective approach to detect moving objects in the stationary background. To detect moving objects in a dynamic scene, adaptive background subtraction techniques have been developed. See C. Stauffer and W. E. L. Grimson, "Adaptive Background mixture Models for Real-time Tracking", CVPR99, June, 1999. Stauffer et al. modeled each pixel as a mixture of Gaussians and used an on-line approximation to update the model. Their system can deal with lighting changes, slow-moving objects, and introducing or removing objects from the scene.

Monnet et al. in A. Monnet, A. Mittal, N. Paragios, and V. Ramesh, "Background Modeling and Subtraction of Dynamic Scenes", In Proc. of International Conference on Computer Vision (ICCV), 2003, Pages 1305-1312, proposed a prediction-based online method for the modeling of dynamic scenes. Their approach has been tested on a coastline with ocean waves and a scene with swaying trees. However, they need hundreds of images without moving objects to learn the background model, and the moving object cannot be detected if they move in the same direction as the ocean waves.

Mittal and Paragios, in A. Mittal and N. Paragios, "Motion-based Background Subtraction using Adaptive Kernel Density Estimation," Proceedings on Computer Vision and Pattern Recognition (CVPR04), 2004, presented a motion-based background subtraction by using adaptive kernel density estimation. In their method, optical flow is computed and utilized as a feature in a higher dimensional space. They successfully handled the complex background, but the computation cost is relatively high.

More recently, L. Li, W. Huang, I. Y. H. Gu, and Q. Tian, "Statistical Modeling of Complex Backgrounds for Foreground Object Detection", IEEE Transaction on Image Processing, Vol. 13, No. 11, 2004, proposed a Bayesian framework that incorporates spectral, spatial, and temporal features to characterize the background appearance at each pixel. Their method can handle both the static and dynamic backgrounds, and good performance was obtained on image sequences containing targets of interest in a variety of environments, e.g., offices, public buildings, subway stations, campuses, parking lots, airports, and sidewalks.

Although many researchers focus on the background subtractions, few papers can be found in the literature for foreground analysis. R. Cucchiara, C. Grana, M. Piccardi, and A. Prati, "Detecting Moving Objects, Ghosts, and Shadows in Video Streams," IEEE Transactions on Pattern Analysis and Machine Intelligence, Vol. 25, No. 10, October 2003, analyzed the foreground as moving object, shadow, and ghost by combining the motion information. The computation cost is relatively expensive for real-time video surveillance systems because of the computation of optical flow.

Recently, the mixture of Gaussians method is becoming popular because it can deal with slow lighting changes, periodical motions from clutter background, slow moving objects, long term scene changes, and camera noises. But it cannot adapt to the quick lighting changes and cannot handle shadows well. A number of techniques have been developed to improve the performance of the mixture of Gaussians method. See, e.g., H. Eng, J. Wang, A. Kam, and W. Yau, "Novel Region-based Modeling for Human Detection within High Dynamic Aquatic Environment," Proceedings on Computer Vision and Pattern Recognition (CVPR04), 2004 and O. Javed, K. Shafique, and M. Shah, "A Hierarchical Approach to Robust Background Subtraction using Color and Gradient Information," IEEE Workshop on Motion and Video Computing, 2002.

SUMMARY

Systems and methods for foreground analysis in real-time video include background subtraction and foreground detection, shadow removal, quick lighting change adaptation, static foreground region detection, foreground fragment reduction, and frame level change detection. This may include a plurality of different processes. One process may include background image extraction and foreground detection. Another process may include integrating texture information of the background image and a current frame to remove false positive foreground areas resulting from lighting changes.

Yet another process may include integrating pixel intensity information by determining a cross-correlation of intensities between a current frame and the background image for each pixel in a foreground mask to remove image shadows. Other processes may include static foreground region detection and fragment reduction.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Systems and methods are presented herein to robustly and efficiently analyze image foreground when background is detected for a fixed camera view by using mixture of Gaussians models. The background is preferably modeled by multiple (e.g., three to five) Gaussian mixtures similar to the methods employed in, e.g. as in the work of Stauffer and Grimson (See C. Stauffer and W. E. L. Grimson, "Adaptive Background mixture Models for Real-time Tracking", CVPR99, June, 1999). Then, the intensity and texture information are integrated to remove shadows and to enable background subtraction algorithms (including, e.g., the mixture of Gaussians method) working for quick lighting changes. These integrations show significant improvements over conventional background subtraction techniques especially in quick lighting changes and shadows.

Once the foreground is available, the foreground objects are analyzed as moving objects and static objects under the same framework of Gaussian mixture models for detecting the background. No additional information such as tracking or motion is needed. Then, whole static regions are pushed back to the background model to avoid a common problem in background subtraction (BGS)—fragmentation (one object becomes multiple parts). Further, the static objects can be detected as abandoned objects or removed objects (ghosts) by using edges around the boundary of the objects.

The methods herein provide a solution for at least the following problems: extending the existing BGS methods (including mixture of Gaussians) work for quick lighting changes by integrating texture information, removing shadows for the existing BGS methods (including mixture of Gaussians) by using normalized cross correlation of the intensities; detecting the static foreground regions by using the same framework of the mixture of Gaussians method for background subtraction; avoiding the fragments of foreground objects by pushing the whole static foreground regions back to the background model.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

Figure 1:
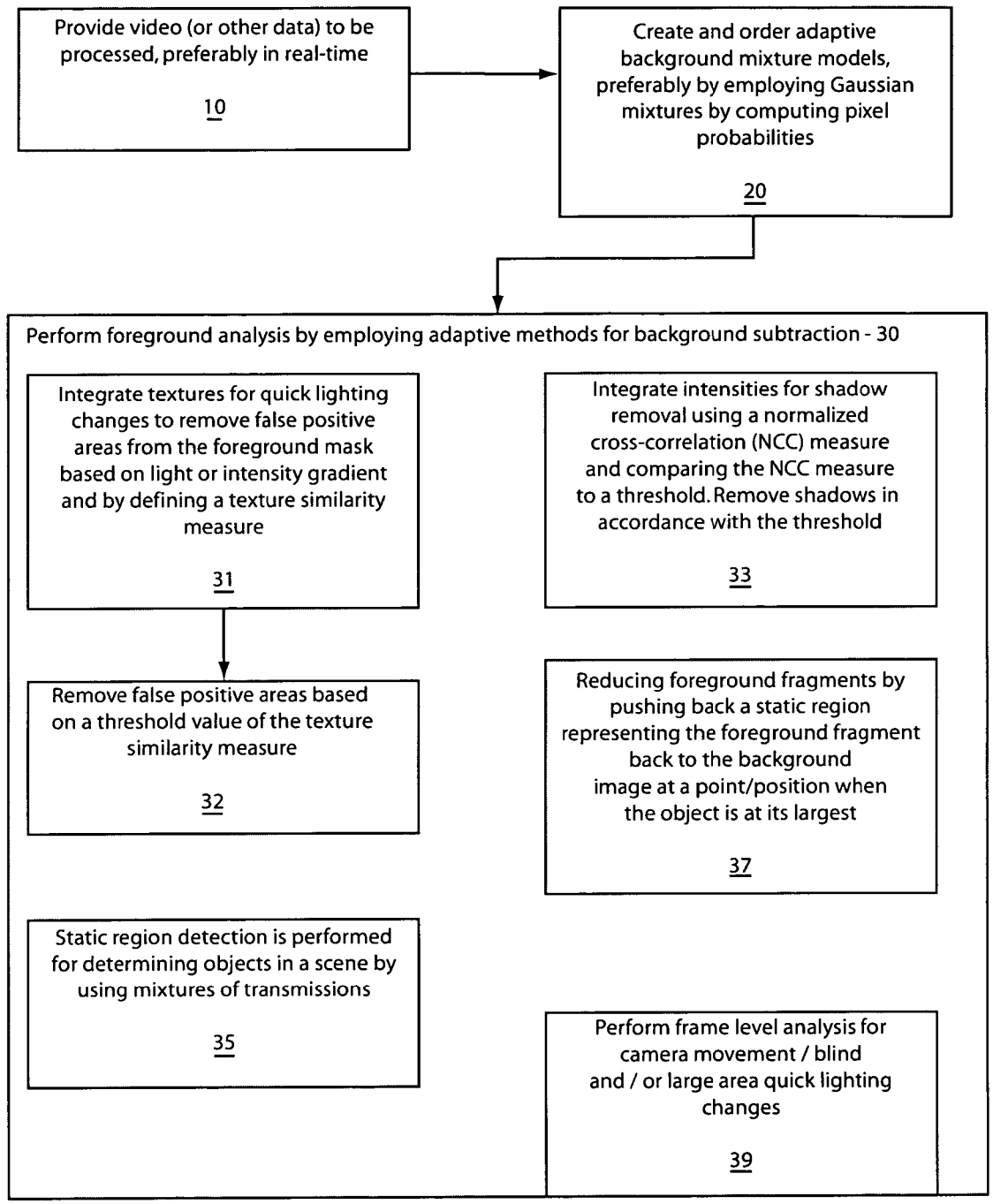
FIG. 1 is a block/flow diagram depicting an exemplary system/method in accordance with an illustrative embodiment.

Referring now to the drawings in which like numerals represent the same or similar elements and initially to FIG. 1, a block/flow diagram showing a system/method for carrying out exemplary embodiments is illustratively shown. In block 10, video or other data is provided for processing. The data is preferably video data, but the present embodiments may include image sequences or other types of image data as well. In one embodiment, a data collection device such as a camera gathers data, and camera preferably includes a video camera. Images may be stored in memory or processed in real time.

In block 20, adaptive background mixture models are created. Background subtraction (BGS) may include the use of known methods. One method that may be employed includes a method proposed by Stauffer and Grimson (Stauffer et al.) in "Adaptive Background mixture Models for Real-time Tracking", CVPR99, June, 1999, incorporated herein by reference. Stauffer et al. introduced a mixture of K Gaussians (K is preferably from 3 to 5) for BGS. For a pixel X at time t, the probability of the pixel can be written as:

$$P(x_t) = \sum_{i=1}^{K} \omega_{i,t} * \eta(X_t, \mu_{i,t}, \Sigma_{i,t}), \text{ where} \quad (1)$$

$$\eta(X_t, \mu, \Sigma) = \frac{1}{(2\pi)^{\frac{n}{2}}|\Sigma|^{\frac{1}{2}}} e^{-\frac{1}{2}(X_t - \mu_t)^T \Sigma^{-1} (X_t - \mu_t)}, \text{ and} \quad (2)$$

$$\omega_{i,t} = (1 - \alpha)\omega_{i,t-1} + \alpha(M_{k,t}). \quad (3)$$

where $\mu$ is the mean and $\alpha$ is the learning rate. By assuming the red, green, and blue pixel values are independent and have the same variances, $$\Sigma_{k,t} = \sigma_k^2 I.$$

After the Gaussians are ordered by the value of $\omega/\alpha$, the first B distributions are chosen as the background model where $$B = \underset{b}{\mathrm{argmin}} \left( \sum_{k=1}^{b} \omega_k > T \right), \quad (4)$$

where T is the minimum portion of the background model. In implementation, two significant parameters, $\alpha$ and T are needed to be set. (See, Stauffer and Grimson).

As described earlier, the mixture of Gaussians method alone while robust to slow lighting changes, periodical motions from clutter background, slow moving objects, long term scene changes, and camera noises, cannot adapt to the quick lighting changes and cannot handle shadows. Solutions to these issues are described below.

In block 30, foreground analysis is performed by employing adaptive methods for background subtraction. The foreground analysis includes one or more processes. In block 31, texture integration for quick lighting changes may be performed. The mixture of Gaussians method generates large areas of false positive foreground when there are quick lighting changes, for example, a light is turned on or off in the scene. To make the mixture of Gaussians method work for quick lighting changes, the texture information is integrated to a foreground mask for removing false positive areas. Texture includes the expected look of the background. The basic idea is that the texture in the false positive foreground areas, which are caused by lighting changes should be similar to the texture in the background. The gradient value is less sensitive to lighting changes and is able to derive an accurate local texture difference measure.

A texture similarity measure may be defined at pixel X between the current frame and the background image as:

$$S(X) = \frac{\sum_{u \in W_x} 2\|g(u)\| \cdot \|g_b(u)\| \cos\theta}{\sum_{u \in W_x} (\|g(u)\|^2 + \|g_b(u)\|^2)}, \quad (5)$$

where $W_x$ denotes the M×N neighborhood (of pixels) centered at pixel X, g and $g_b$ are the gradient vector of the current frame and the background image respectively, and $\theta$ is the angle between the vectors. The gradient vector $g(X) = (g^x(X), g^y(X))$, and the partial derivatives and $g^x(X)$ and $g^y(X)$ can be obtained by any gradient detectors, for example, the Sobel operator, which is known in the art.

In the false positive foreground areas caused by quick lighting changes, there are little texture changes between the current frame and the background. Hence, $S(X) \approx 1$. The foreground mask (false positive due to flash or quick light changes) will be removed for the areas with $S(X) \geq T_s$ where $T_s$ is the similarity threshold. The similarity threshold may be user-defined or set automatically depending on given conditions or criteria.

In block 33, intensity integration for shadow removal may be performed. Color information may be used for shadow removal, however, to keep the present system working for grayscale images, the intensity information is preferable to be employed rather than using color information. The normalized cross-correlation of the intensities is calculated at each pixel of the foreground region between the current frame and the background image. For pixel X, in the M by N neighborhood, the normalized cross-correlation (NCC) is preferably calculated as $$NCC(X) = \frac{\left(\sum_{u \in W_x} I_t(u) \cdot I_b(u) - \frac{1}{MN} \sum_{u \in W_x} I_t(u) \sum_{u \in W_x} I_b(u)\right)}{\sqrt{\left(\sum_{u \in W_x} I_t^2(u) - \frac{1}{MN}\left[\sum_{u \in W_x} I_t(u)\right]^2\right)\left(\sum_{u \in W_x} I_b^2(u) - \frac{1}{MN}\left[\sum_{u \in W_x} I_b(u)\right]^2\right)}}, \quad (6)$$

where $W_x$ denotes the M×N neighborhood centered at pixel X, $I_t(u)$ and $I_b(u)$ are the intensity at pixel u of the current frame and the background, respectively.

The pixel X is shadow if and $NCC(X) \geq T_s$ and $I_t(X) \geq T_s$.

Here the constraint of $I_t(X) \geq T_s$ may be used to avoid detected shadows in very dark areas. Otherwise, the pixel X is real foreground information. $T_s$ may be user-defined or set automatically based on conditions.

Static object detection and foreground fragment reduction may be performed. In block 35, static region detection includes detecting the static region by using the mixture of Gaussians of the background model.

Figure 2:
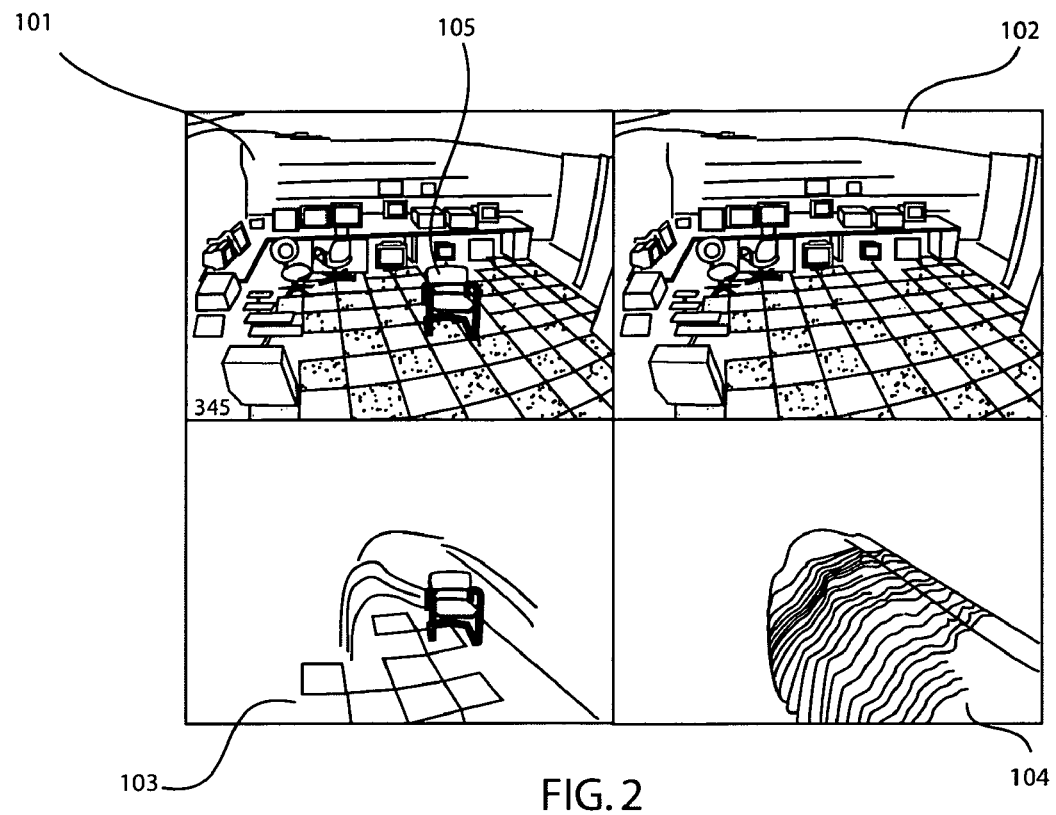
FIG. 2 shows images, which demonstrate static object detection in accordance with an illustrative embodiment.

Referring to FIG. 2, an example of a detected static object and three Gaussian mixtures of the background model are illustratively shown. For static region detection, the static region mask is visualized on the original image (image 101). The 1st mixture of Gaussians (image 102), the 2nd mixture of Gaussians (image 103), and the 3rd mixture of Gaussians (image 104) of the background model are shown respectively. Generally, a first mixture of Gaussians in image 101 shows persistence pixels (pixels remaining the same over time) and represents the background image. The repetitive variations and the relative static regions are updated to a second mixture of Gaussians in image 102. A static chair 105 in the image can be seen in image 103. A third mixture of Gaussians in image 104 represents the pixels with quick changes.

The (B+1)th mixture of Gaussians of the background model (see equation (4)) is used to detect if a foreground pixel belongs to the static region:

$$\text{pixel} \in \text{static region, if } \omega_{B+1} > T. \quad (7)$$

In block 37, foreground fragment reduction may be performed. Foreground fragments are usual for many background subtraction methods. In the mixture of Gaussians BGS method, the different parts of a static region are often updated to the background (BG) model at different speeds based on the similarity of the pixel values between the static region and the background model. Hence many foreground fragments are caused by static regions, for example, a moved object may leave image fragments visible in a given frame even though the object is no longer there. By pushing back the static region to the BG model when the static region is biggest can avoid the issue of the fragment in the foreground. To push the static region back to the background model, the weight of the static region is reset as the maximum weight, which was defined in the program or method. The mean and variance of the (B+1)th Gaussian distribution is exchanged with the first Gaussian distribution for each pixel in the static region mask.

Figure 3:
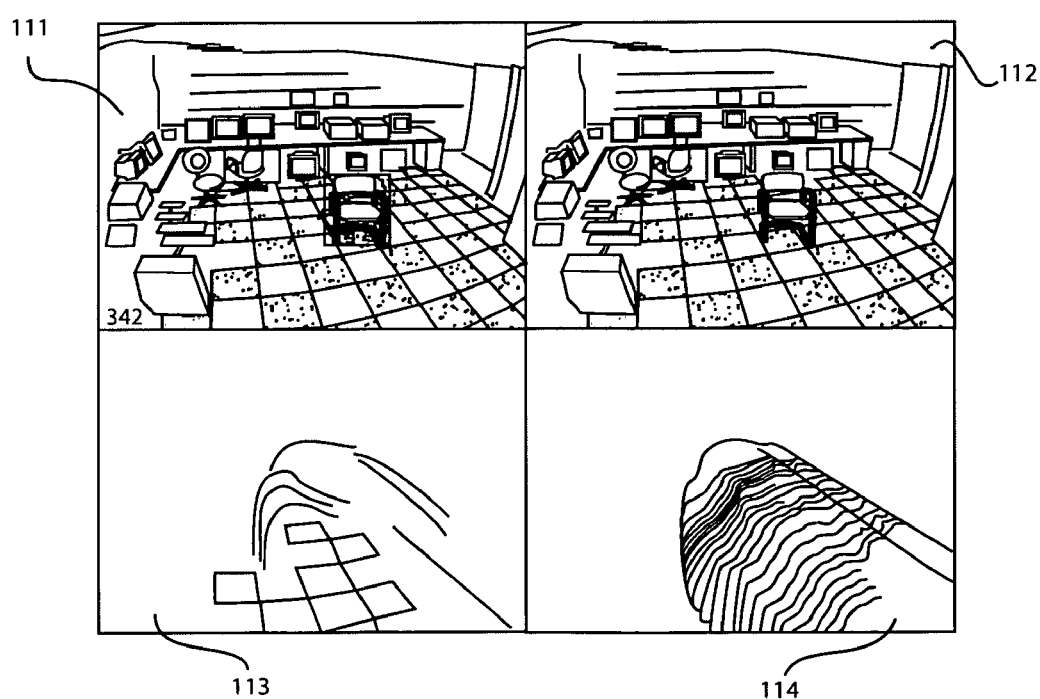
FIG. 3 shows images, which demonstrate foreground fragment reduction in accordance with an illustrative embodiment.

Referring to FIG. 3, the static region detected in FIG. 2 has been pushed back to a background image 111. Notice that the region corresponding to the static region in the 2nd mixture in image 113 has been changed with the region in the background image 112.

For foreground fragment reduction, the static region mask is visualized on the original image (image 111). The 1st mixture of Gaussians (image 112), the 2nd mixture of Gaussians (image 113), and the 3rd mixture of Gaussians (image 114) of the background model are shown respectively.

The static region (e.g., the chair in the images) is pushed to the background image (image 112)) from the 2nd mixture (image 113) when the size of the static region is biggest.

In block 39, frame level analysis for camera movement/blinding and/or quick lighting changes may be performed. In the present system, frame level analysis is useful for a plurality of reasons. Two situations include camera move/blind and large area quick lighting changes (e.g., turn on or turn off lights). If a camera was moved or becomes blind (is covered or power is lost)), mainly the size of the bounding box of the foreground region is very close to the size of the whole image (e.g., the size ratio>0.95).

If there are large area quick lighting changes, the foreground area will be a large part of the whole image (e.g., the area ratio>0.7). In both cases, the background will be reset to the current frame.

EXPERIMENTAL RESULTS

The present embodiments may be employed in real-time smart video surveillance systems. For example, a system, such as the one described in A. Hampapur, L. Brown, J. Connell, M. Lu, H. Merkl, S. Pankanti, A. W. Senior, C. Shu, and Y-L Tian, "The IBM Smart Surveillance System," IEEE CVPR, Washington D.C., June 2004, incorporated herein by reference and was tested on live video for several months.

Some examples demonstrate the effectiveness of the present methods for background subtraction and foreground analysis in a variety of environments and tests were performed by the present inventors. The same parameters were used for all sequences (videos of the results were also reviewed).

BGS results for sequences with quick lighting changes and shadows provided significant improvements over prior art systems. A PETS 2001 sequence with quick lighting changes (PETS refers to the IEEE Performance Evaluation of Tracking and Surveillance Workshops) was employed in one instance. Large areas of false positive foreground were detected by the mixture of Gaussians of the prior art (e.g., Stauffer et al.). However, the present method successfully handled the quick lighting changes by integrating texture information thereby eliminating and/or significantly reducing false positive foreground areas.

The results from the present methods were compared to those from the mixture of Gaussians method (e.g., Stauffer et al.) for shadow removal. By integrating intensity information, most of the shadows were removed by the present method, where the shadows remained in the Stauffer et al. method.

Foreground analysis results for static object detection and foreground fragment reduction were also tested. In the test sequence, a chair was left in a frame (e.g., frame number 230). Then the chair was moved to another position at about frame number 540 and was abandoned at the new position at about frame 560. At three moments, (at frame 343, 569, and 664) the static objects were detected, and the static regions were pushed back to the background model in the next frame (frame 344, 570, and 665) to avoid fragments.

Without pushing the static regions back (as in conventional techniques) to the background model, many foreground fragments were caused by the static region detected at frames 343, 569, and 665. The fragments had been adapted to the background model until frame 410, 633, and 731. The fragments lasted about 65 frames and made the tracking more difficult.

Camera move/blind detection successfully detected camera movements and power done (camera powered off) events by frame level processing.

The present system and methods robustly and efficiently analyze foreground areas and improve the BGS methods (including mixture of Gaussians) for quick lighting changes and shadow removal by integrating texture and intensity information. Without using any tracking or motion information, static objects were detected by using the same framework of the Gaussian mixture models. The whole static regions are pushed back to the background model to avoid fragment problems in background subtraction.

The method advantageously works well in most situations. The following additional observations can be made: 1) the learning rate a affects how long an object needs to be static to be considered as a static object, 2) holes may appear on the foreground mask for large homogeneous objects because there may be less texture.

Figure 4:
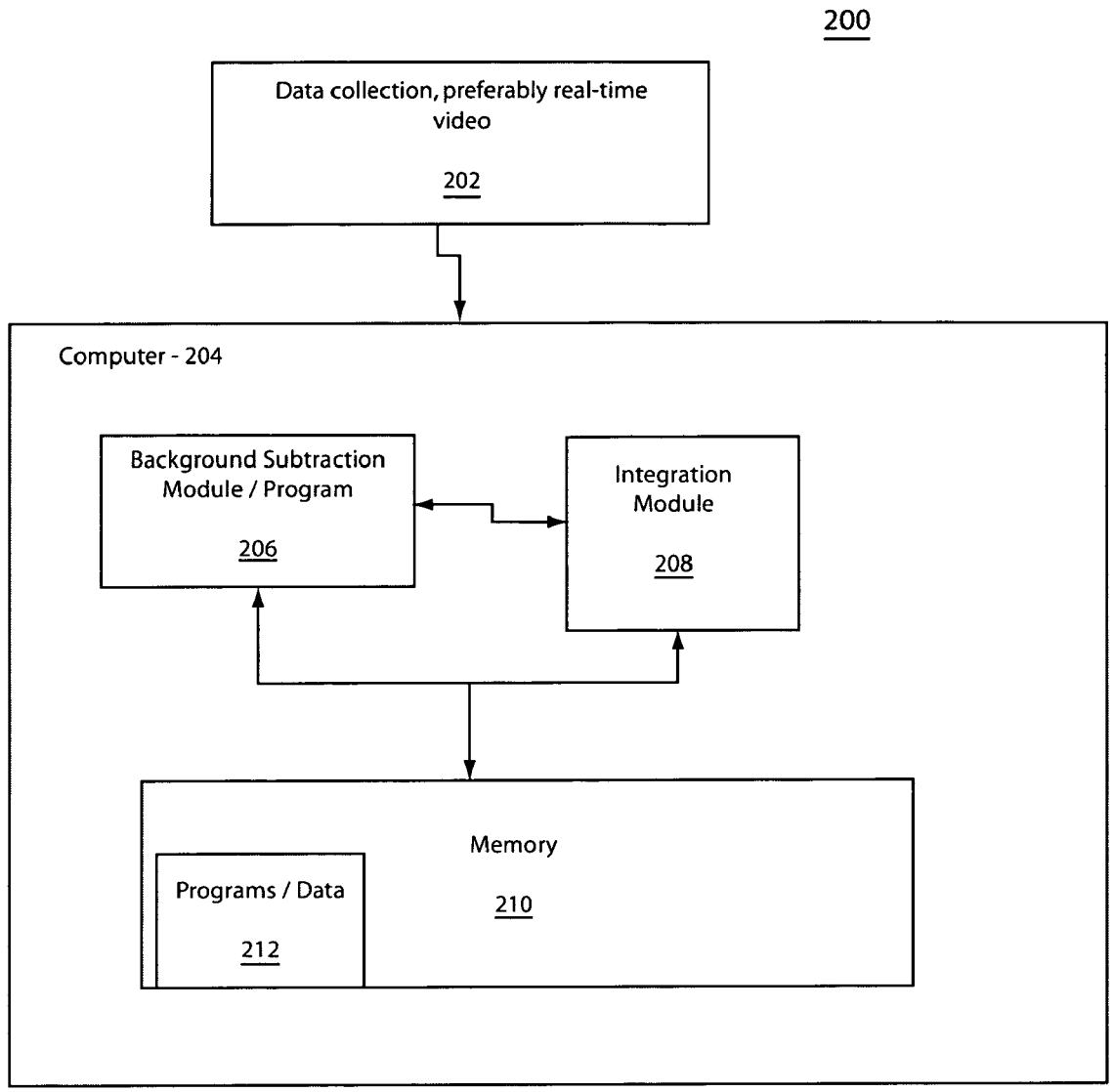
FIG. 4 is a block diagram depicting an exemplary system in accordance with an illustrative embodiment.

Referring to FIG. 4, a system 200 for foreground analysis is illustratively shown in accordance with one embodiment. System 200 preferably works with real-time video although the aspects provided herein may be employed to recorded video or other data types, e.g., image sequence. A data collection or data storage device 202 may include a video camera for a video surveillance system or any video or other type of camera. Device 202 may include stored data as well which can be processed by system 200.

A computer, processor or computer-like device 204 capable of running software and executing mathematical computation is provided and receives the data from device 202. A background subtraction module 206 uses mixtures of Gaussians to determine a background image and subtracts the background image in accordance processes run in an integration module 208. The subtraction module 206 computes pixel probabilities and determines, based on criteria, which densities represent the background image.

The integration module 208 may be employed for one or more tasks, which may be all combined or executed individually. Integration module 208 determine false positive foreground areas by comparing texture information of the background image or model to a foreground mask for removal of the false positive foreground areas resulting from quick lighting changes or the like. The removal of the false positive areas is preferably performed by subtraction module 206.

The integration module 208 may integrate the texture information by computing/defining a texture similarity measure for a pixel between a current frame and the background image based on a pixel intensity gradient.

The integration module 208 may determine shadows from the background image or model preferably by integrating pixel intensity information by determining a cross-correlation of intensities between a current frame and the background image for each pixel in a foreground mask. Image shadows may be removed by subtraction module 206.

The integration module 208 may compute a normalized cross-correlation (NCC) in a neighborhood of a given pixel and comparing the NCC value to a threshold to determine in the pixel is affected by shadow.

The system 200 may further include programs or data 212 stored in a memory 210 to execute detection of static objects, camera movement, quick lighting changes and shadows as set forth hereinabove.

System 200 preferably includes a real time video surveillance system. The system 200 is robust and illustratively runs about 130 frame per second (fps) for color images and 150 fps for grayscale images at size 160×120 in 2 GB Pentium™ IV machines with MMX™ optimization. Other speeds and system parameters are also contemplated. Having described preferred embodiments of a system and method robust and efficient foreground analysis for real-time video surveillance (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for foreground analysis in real-time video, comprising the steps of:
    determining mixtures of Gaussians for different aspects of an image;
    detecting a static foreground region by using the mixtures of Gaussians to identify whether a pixel belongs to the static region or a background region; and
    processing the image in accordance with two or more of:
        detecting a static region to determine objects in a scene using the mixtures of Gaussians of the background region;
        integrating texture information of the background image to a foreground mask to remove false positive foreground areas resulting from lighting changes; and
        integrating pixel intensity information by determining a cross-correlation of intensities between a current frame and the background image for each pixel in a foreground mask to remove image shadows.

2. The method as recited in claim 1, wherein the step of integrating texture information of the background image to a foreground mask to remove false positive foreground areas resulting from lighting changes includes defining a texture similarity measure for a pixel between a current frame and the background image based on a pixel intensity gradient.

3. The method as recited in claim 2, wherein the texture similarity measure provides a criterion for removing the false positive foreground areas to perform the step of subtracting the background image.

4. The method as recited in claim 1, wherein the Gaussian mixtures include at least one of: Gaussian mixtures for the background image, Gaussian mixtures for quick lighting changes, and Gaussian mixtures for repetitive variations in the image to determine if a foreground pixel belongs to a static region.

5. The method as recited in claim 1, further comprising the step of reducing foreground fragments by pushing back a static region representing the foreground fragment back to the background image at a point when the static region is largest.

6. The method as recited in claim 5, wherein the pushing back the static region includes resetting a pixel weight to a maximum value by exchanging mean and variance values between Gaussian distributions.

7. The method as recited in claim 1, further comprising the step of resetting the background image to a current frame during at least one of camera movement, camera blind and quick lighting changes.

8. A computer-readable medium storing a computer program to perform method steps for foreground analysis in real-time video as recited in claim 1.

9. A method for foreground analysis in real-time video, comprising the steps of:
   determining mixtures of Gaussians for different aspects of an image;
   detecting a static region by using the mixtures of Gaussians to identify whether a pixel belongs to the static region or a background region; and
   reducing foreground fragments by pushing back the entire static region back to the background region at a point when the static region is largest.

10. The method as recited in claim 9, further comprising the step of integrating pixel intensity information by determining a cross-correlation of intensities between a current frame and the background image for each pixel in a foreground mask to remove image shadows.

11. The method as recited in claim 10, wherein the step of integrating pixel intensity information by determining a cross-correlation of intensities between a current frame and the background image for each pixel in a foreground mask to remove image shadows includes calculating a normalized cross-correlation (NCC) in a neighborhood of a given pixel and comparing the NCC value to a threshold to determine in the pixel is affected by shadow.

12. The method as recited in claim 9, further comprising the step of integrating texture information of the background image to a foreground mask to remove false positive foreground areas resulting from lighting changes.

13. The method as recited in claim 9, wherein the Gaussian mixtures include at least one of: Gaussian mixtures for the background image, Gaussian mixtures for quick lighting changes, and Gaussian mixtures for repetitive variations in the image to determine if a foreground pixel belongs to a static region.

14. The method as recited in claim 9, wherein the pushing back the static region includes resetting a pixel weight to a maximum value by exchanging mean and variance values between Gaussian distributions.

15. The method as recited in claim 9, further comprising the step of resetting the background model to a current frame during at least one of camera movement, camera blind and quick lighting changes.

16. A computer-readable medium storing a computer program to perform method steps for foreground analysis in real-time video as recited in claim 9.

17. A system for foreground analysis in real-time video, comprising:
   a background subtraction module which determines a mixture of Gaussians for a background region of an image and subtracts out portions of the image in accordance with an integration module; and
   the integration module detects at least static regions by using the mixtures of Gaussians to identity whether a pixel belongs to the static region or the background region and reduces foreground fragments of the static regions by pushing back each entire static region to the background region at a point when the static region is largest.

18. The system as recited in claim 17, wherein the integration module detects false positive foreground areas and background subtraction module removes false positive foreground areas by comparing texture information of the background image to a foreground mask to remove the false positive foreground areas resulting from quick lighting changes.

19. The system as recited in claim 18, wherein the subtraction module computes pixel probabilities and determines, based on criteria, which densities represent the background image.

20. The system as recited in claim 18, wherein the integration module computes a normalized cross-correlation (NCC) in a neighborhood of a given pixel and compares the NCC value to a threshold to determine in the pixel is affected by shadow.

21. The system as recited in claim 18, wherein the integration module integrates texture information by computing a texture similarity measure for a pixel between a current frame and the background image based on a pixel intensity gradient.

22. The system as recited in claim 18, further comprising a camera for collecting video data.

23. The system as recited in claim 18, wherein the system detects static objects, camera movement, quick lighting changes and shadows.

24. The system as recited in claim 17, wherein the integration module detects shadows and the background subtraction module removes shadows by integrating pixel intensity information by determining a cross-correlation of intensities between a current frame and the background image for each pixel in a foreground mask to remove image shadows.

* * * * *

UNITED STATES PATENT AND TRADEMARK OFFICE
CERTIFICATE OF CORRECTION

PATENT NO. : 7,620,266 B2  Page 1 of 1
APPLICATION NO. : 11/039442
DATED : November 17, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1336 days.

Signed and Sealed this

Twenty-sixth Day of October, 2010

David J. Kappos
*Director of the United States Patent and Trademark Office*